United States Patent
Oswald et al.

(10) Patent No.: US 12,325,456 B2
(45) Date of Patent: Jun. 10, 2025

(54) SYSTEMS AND METHODS FOR DETECTING BRAKE SYSTEM ANOMALIES

(71) Applicant: Westinghouse Air Brake Technologies Corporation, Pittsburgh, PA (US)

(72) Inventors: James A. Oswald, Coggon, IA (US); Ann K. Grimm, Cedar Rapids, IA (US); Kevin Angel, Marion, IA (US); James Trainor, Cedar Rapids, IA (US); Phillip A. Burgart, Cedar Rapids, IA (US); Kendrick W. Gawne, Cedar Rapids, IA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 734 days.

(21) Appl. No.: 17/313,502

(22) Filed: May 6, 2021

(65) Prior Publication Data
US 2022/0355781 A1    Nov. 10, 2022

(51) Int. Cl.
*B61L 15/00* (2006.01)
*B60T 8/17* (2006.01)
(Continued)

(52) U.S. Cl.
CPC ........ *B61L 15/0054* (2013.01); *B60T 8/1705* (2013.01); *B60T 17/221* (2013.01);
(Continued)

(58) Field of Classification Search
CPC ..... B61H 13/00; B60T 13/665; B60T 17/221; B60T 17/228; B60T 2270/403;
(Continued)

(56) References Cited

U.S. PATENT DOCUMENTS 3,304,420 A * 2/1967 Bowman ............... B60T 17/228
73/39
3,512,497 A * 5/1970 Falke .................... B60T 17/228
73/40.5 R
(Continued)

FOREIGN PATENT DOCUMENTS

CN   111688758 A   9/2020
EA     021249 B1   5/2015
(Continued)

OTHER PUBLICATIONS

CFR-2011-title49-vol4-sec232-205 Federal Railroad Administration DOT (Year: 2011).*
(Continued)

*Primary Examiner* — Carl C Staubach
(74) *Attorney, Agent, or Firm* — K&L Gates LLP

(57) ABSTRACT

A method may include detecting a first pressure and a second pressure of a fluid in a brake pipe of a vehicle system that includes a plurality of vehicles and extends from a lead vehicle to an end vehicle. The first pressure may be measured in the lead vehicle and the second pressure may be measured in the end vehicle. The method may further include determining a pressure differential signature between the first pressure and the second pressure and evaluating the pressure differential signature with a machine learning model to determine whether a blockage or a leak exists in the brake pipe. A system may include one or more processors configured to detect a first pressure and a second pressure of a fluid in a brake pipe. The one or more processors may be further configured to determine a pressure differential signature between the first pressure and the second pressure and evaluate the pressure differential signature with a machine learning model to determine whether a blockage exists in the brake pipe.

43 Claims, 6 Drawing Sheets

(51) Int. Cl.
  *B60T 17/22* (2006.01)
  *B61L 23/04* (2006.01)
  *B61L 25/02* (2006.01)
  *G06N 5/04* (2023.01)
  *G06N 20/00* (2019.01)
  *G06V 20/56* (2022.01)

(52) U.S. Cl.
  CPC ........ *B60T 17/228* (2013.01); *B61L 15/0018* (2013.01); *B61L 15/0081* (2013.01); *B61L 23/041* (2013.01); *B61L 25/021* (2013.01); *B61L 25/023* (2013.01); *G06N 5/04* (2013.01); *G06N 20/00* (2019.01); *G06V 20/56* (2022.01); *B60T 2270/406* (2013.01); *B60T 2270/88* (2013.01)

(58) Field of Classification Search
  CPC ......... B60T 2270/406; B60T 2270/413; B60T 2270/88; B60T 8/1705; B60T 8/174; G06N 20/00; G06N 3/08; G06N 5/04; G06V 20/56
  See application file for complete search history.

(56) References Cited

U.S. PATENT DOCUMENTS

| | | | | |
|---|---|---|---|---|
| 4,582,280 A * | 4/1986 | Nichols | ................... | B61L 27/20 340/12.51 |
| 9,283,945 B1 * | 3/2016 | Kernwein | ............. | B60T 17/228 |
| 2002/0153765 A1 * | 10/2002 | Levy | ................... | B60T 13/665 303/6.1 |
| 2017/0305449 A1 * | 10/2017 | Klemanski | ............. | B61H 11/06 |
| 2018/0050711 A1 * | 2/2018 | Rice | .................... | B61L 15/0081 |
| 2018/0315260 A1 * | 11/2018 | Anthony | ................ | G06N 5/022 |
| 2019/0164073 A1 * | 5/2019 | Khakwani | ............... | E21B 47/10 |
| 2020/0079343 A1 * | 3/2020 | Martin | .................... | B60T 13/66 |
| 2020/0276962 A1 * | 9/2020 | Herges | ................... | B60T 8/885 |
| 2021/0179054 A1 * | 6/2021 | Wright | ................. | B60T 8/1705 |
| 2022/0032978 A1 * | 2/2022 | Haas | .................. | B61L 15/0054 |
| 2022/0355780 A1 * | 11/2022 | Oswald | .................. | B60T 17/04 |
| 2023/0249662 A1 * | 8/2023 | Luo | ....................... | B60T 13/662 340/438 |

FOREIGN PATENT DOCUMENTS

| | | |
|---|---|---|
| RU | 2711476 C1 | 1/2020 |
| RU | 2739634 C2 | 12/2020 |

OTHER PUBLICATIONS

NASA Pitot Tube (Year: 1738).*
NASA Bernoulli's Equation (Year: 1738).*
240408 NIST Special Publication 811 e2008 (Year: 2008).*
Search Report mailed Oct. 31, 2022 for corresponding Eurasian Application No. 202291049 (3 pages).
English Translation of Search Report mailed Oct. 31, 2022 for corresponding Eurasian Application No. 202291049 (2 pages).
Office Action mailed Dec. 8, 2022 for corresponding Eurasian Application No. 202291049. English translation provided. (4 pages).
1st Examination Report mailed Feb. 8, 2024 for corresponding Australian application No. 2022202435 (4 pages).
Patent Search Report mailed 23-Nov. 2023 for corresponding Eurasian application No. 202392560 (5 pages).

* cited by examiner

SYSTEMS AND METHODS FOR DETECTING BRAKE SYSTEM ANOMALIES

BACKGROUND

Technical Field

The present disclosure relates to systems and methods for detecting anomalies in brake systems of vehicle systems.

Discussion of Art

Vehicle systems may include plural vehicles linked together and include a brake system that includes a brake pipe that carries a brake fluid, for example air, that is controlled to apply and release brakes in each vehicle. The brake pipe extends continuously from a lead vehicle of the vehicle system to an end or trailing vehicle. Anomalies in the brake pipe, such as kinks, blockages, and/or leaks, may adversely affect the ability of the brake system to brake vehicles in the vehicle system. While some control systems can detect overspeed or overrun conditions of the vehicle system and apply penalty brakes, the penalty brakes are not able to overcome the anomalies in the brake pipe and accidents may occur when effective braking of all vehicles in the system is not possible due to the anomalies in the brake pipe.

BRIEF DESCRIPTION

In accordance with one embodiment, a method may include detecting a first pressure and a second pressure of a fluid in a brake pipe of a vehicle system that includes a plurality of vehicles, the brake pipe extending from a lead vehicle to an end vehicle of the plurality of vehicles, the first pressure being measured in the lead vehicle and the second pressure being measured in the end vehicle, determining a pressure differential signature between the first pressure and the second pressure. The method may further include evaluating the pressure differential signature with a machine learning model to determine whether a blockage exists in the brake pipe.

In accordance with one embodiment, a system may include one or more processors configured to detect a first pressure and a second pressure of a fluid in a brake pipe of a vehicle system that includes a plurality of vehicles, the brake pipe extending from a lead vehicle to an end vehicle of the plurality of vehicles, the first pressure being measured in the lead vehicle and the second pressure being measured in the end vehicle and determine a pressure differential signature between the first pressure and the second pressure. The one or more processors may be further configured to evaluate the pressure differential signature with a machine learning model to determine whether a blockage exists in the brake pipe.

In accordance with one embodiment, a vehicle system may include a plurality of vehicles, the plurality of vehicles including a lead vehicle and an end vehicle, a brake system comprising a brake pipe extending along the plurality of vehicles from the lead vehicle to the end vehicle, and one or more processors. The one or more processors may be configured to detect one or more of (a) a first pressure and a second pressure of a fluid in the brake pipe, the first pressure being measured in the lead vehicle and the second pressure being measured in the end vehicle, or (b) a flow of the fluid in the brake pipe and determine a pressure differential signature between the first pressure and the second pressure. The one or more processors may be further configured to evaluate one or more of the pressure differential signatures or the flow with a machine learning model to determine whether one or more of a blockage or a leak exists in the brake pipe.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to methods and systems for monitoring a brake system of a vehicle system that includes a plurality of vehicles. Pressure and flow of brake fluid in a brake pipe of the brake system may be detected and/or monitored and the values evaluated to determine if any anomalies exist in the brake pipe that would affect full application of the brake system. The brake pressures and flows may be evaluated using artificial intelligence, for example by a machine learning model in the form of a neural network, to determine if the values correspond to an anomalous or non-anomalous condition of the brake system.

The brake pressures and flows may be monitored periodically or continuously during operation of the vehicle system. An operator of the vehicle system may be provided a notification that an anomalous condition of the brake system exists to provide the operator with an opportunity to correct any anomaly. A penalty brake may also be applied if the operator does not respond to the notification or is unable to correct the anomaly. The system for monitoring the brake system may also operate to correct or reduce the effects of any anomaly, for example by pulsing brake fluid in the brake pipe to remove a blockage or bypassing a blockage or a leak by increasing or decreasing brake fluid pressure in the brake pipe at a location past the anomaly.

Figure 1:
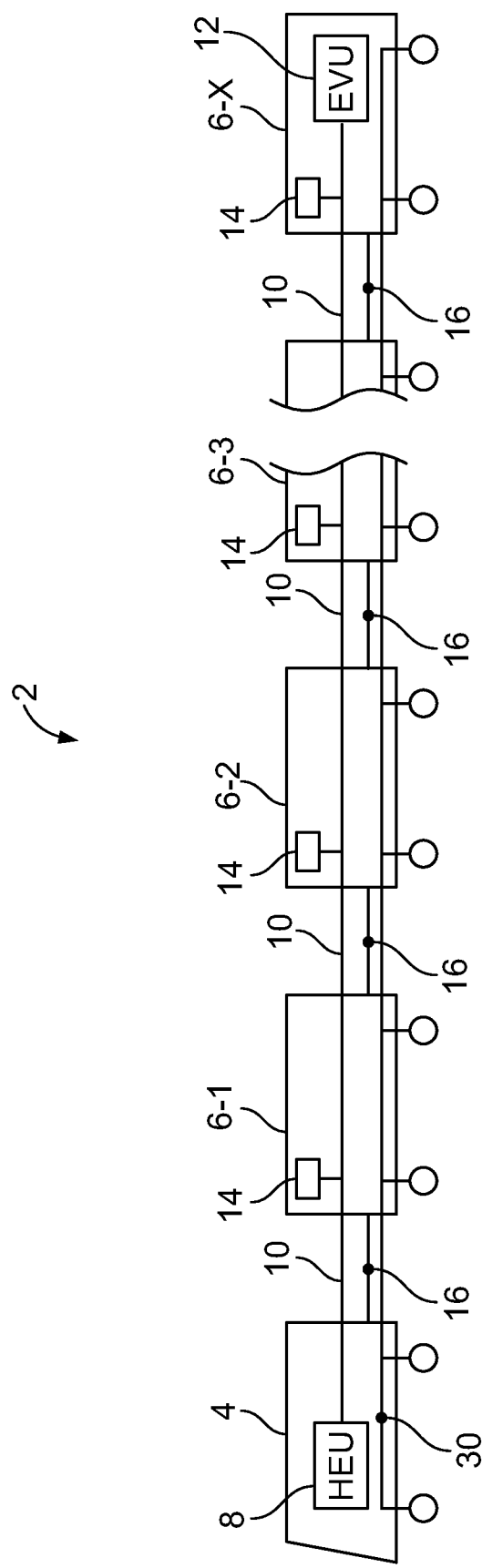
FIG. 1 schematically depicts a vehicle system according to one embodiment.

Referring to FIG. 1, according to one embodiment a vehicle system 2 may include a lead vehicle 4 and a one or more additional vehicles 6-1 through 6-X. The lead vehicle may include propulsion-generating vehicle able to provide its own propulsion. The additional vehicles may be non-propulsion-generating vehicles. According to one embodiment, one or more of the additional vehicles may be a propulsion-generating vehicle. As shown in FIG. 1, the last additional vehicle may be an end vehicle. According to one embodiment, the vehicle system may be a train and the lead vehicle may be a locomotive. According to one embodiment, the lead vehicle of the vehicle system may be a non-propulsion-generating vehicle and the propulsion-generating vehicle or vehicles may be positioned in the vehicle system between the lead vehicle and the end vehicle. According to one embodiment, the end vehicle may be a propulsion-generating vehicle.

The lead vehicle and the additional vehicles in the vehicle system may be communicatively coupled by a wired connection 10, such as a trainline cable. The lead vehicle may include a head-end-unit (HEU) 8. The HEU can be coupled via the wired connection to an end-vehicle-unit (EVU) 12. As shown in FIG. 1, the EVU device is provided in the end vehicle. According to one embodiment, the HEU may be coupled via the wired connection to an electronically controlled pneumatic (ECP) controller 14 in each additional vehicle. Each ECP controller may be configured to respond to electronic braking commands from the HEU to control the brakes of each vehicle of the vehicle system. A brake pipe 30 extends from the lead vehicle through the additional vehicles to the end vehicle. The brake pipe carries brake fluid to control application and release of brakes in the vehicles of the vehicle system. Brake fluid may be provided from a reservoir onboard the vehicle system. According to one embodiment, mechanical couplers 16 couple adjacent vehicles of the vehicle system to each other.

Figure 2:
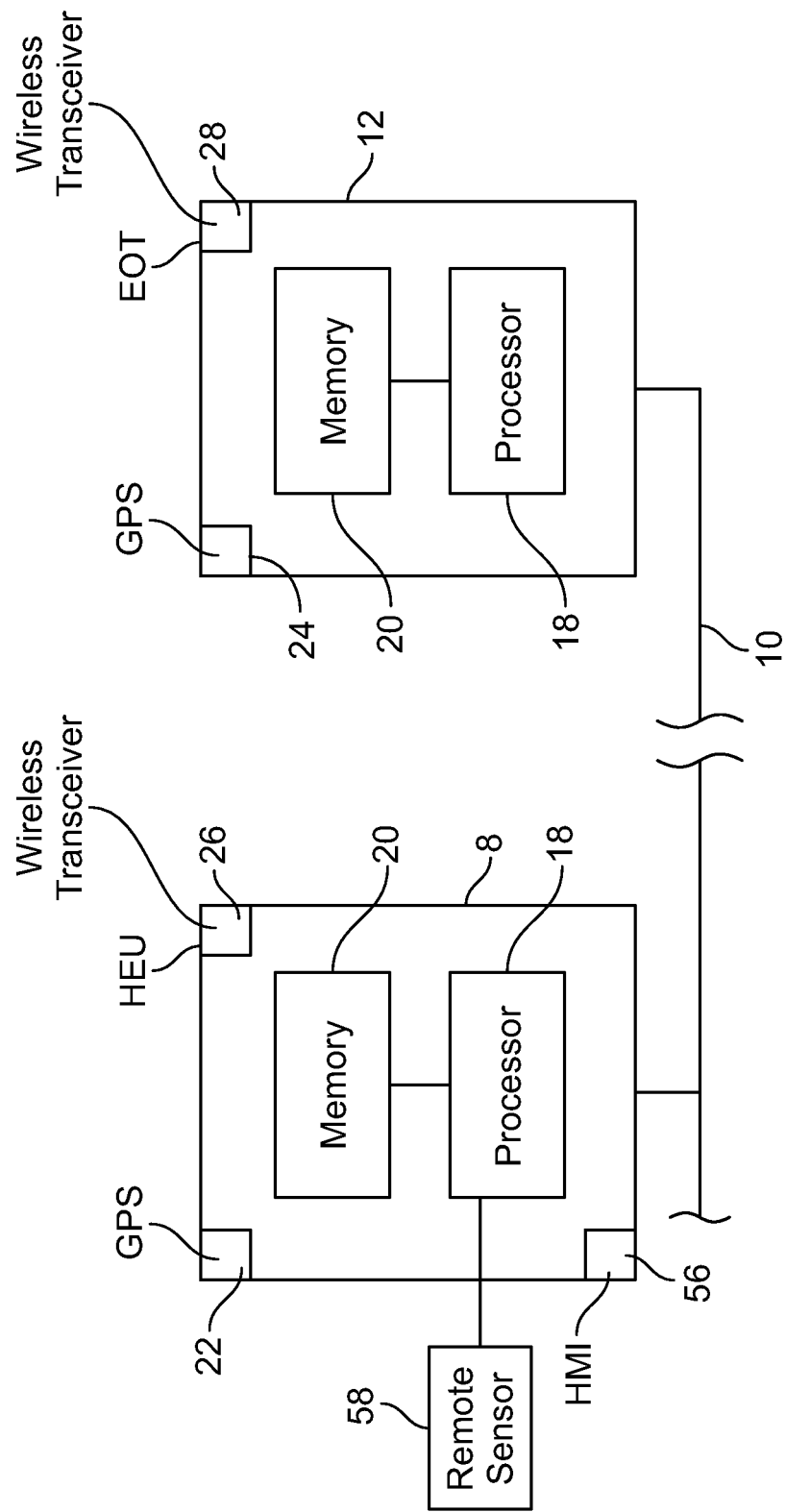
FIG. 2 schematically depicts a system for detecting anomalies of a brake system of the vehicle system, according to one embodiment.

Referring to FIG. 2, the wired connection acts as a communication network, such as, for example, without limitation, a local area network (LAN), between the HEU and the EVU. The HEU and the EVU may each include a processor 18 communicatively coupled to the wired connection and a memory 20 coupled to the processor and operative for storing software control program(s) and/or operational data. According to one embodiment, the HEU and the EVU may be connected by a wireless connection.

According to one embodiment, a "controller" may include the one or more processors of the HEU and/or the EVU. As disclosed herein, processing by a controller, refers to processing that may be performed by either one or more of processors of the HEU and/or the EVU.

According to one embodiment, each memory can include dynamic, volatile memory, e.g., RAM, that loses program code and data stored therein when power to memory is lost or when overwritten by the corresponding processor, and a non-volatile memory. e.g., ROM, flash memory and the like, the latter of which (non-volatile) memory, can store at least, an embedded operating system and embedded data for use by the corresponding HEU or the EVU processor in the presence or absence of power being applied to the non-volatile memory of the processor. According to one embodiment, the HEU and/or the EVU can receive electrical power for their operation via the wired connection from a battery or generator of the lead vehicle or another vehicle.

According to one embodiment, the HEU can include or be coupled to a receiver 22 disposed in the lead vehicle and the EVU can include or be coupled to a receiver 24 disposed in the end vehicle. The receivers may be configured to receive location information, for example GPS information, that identifies a location of the vehicle system.

According to one embodiment or example, the connection or communication network may be a wired network, a wireless network, or a combination of both a wired and a wireless network. According to one embodiment, the HEU of the lead vehicle and the EVU of the end vehicle may be in communication wirelessly, for example via wireless transceivers 26 and 28 of the HEU and the EVU, respectively.

The processor of the HEU may receive input from one or more remote sensors 58. The remote sensors may generate signals that indicate information such as pressure readings from pressure sensors in the brake system of the vehicle system, including pressure sensors in the brake pipe at locations along the length of the brake pipe. The remote sensors may also detect a flow of brake fluid in the brake pipe at locations along the brake pipe and provide the flow information to the HEU. The remote sensors may also provide signals that include information such as a speed of a vehicle or vehicles of the vehicle system. The one or more sensors may be wired to the HEU or may transmit the information wirelessly. The one or more remote sensors may also provide the information to the EVU in addition or alternatively to the HEU. The vehicle system may also include transceivers at one or more locations in the vehicle system to receive the signals from the one or more remote sensors and transmit the information to one or more of the HEU or the EUV.

Figure 3:
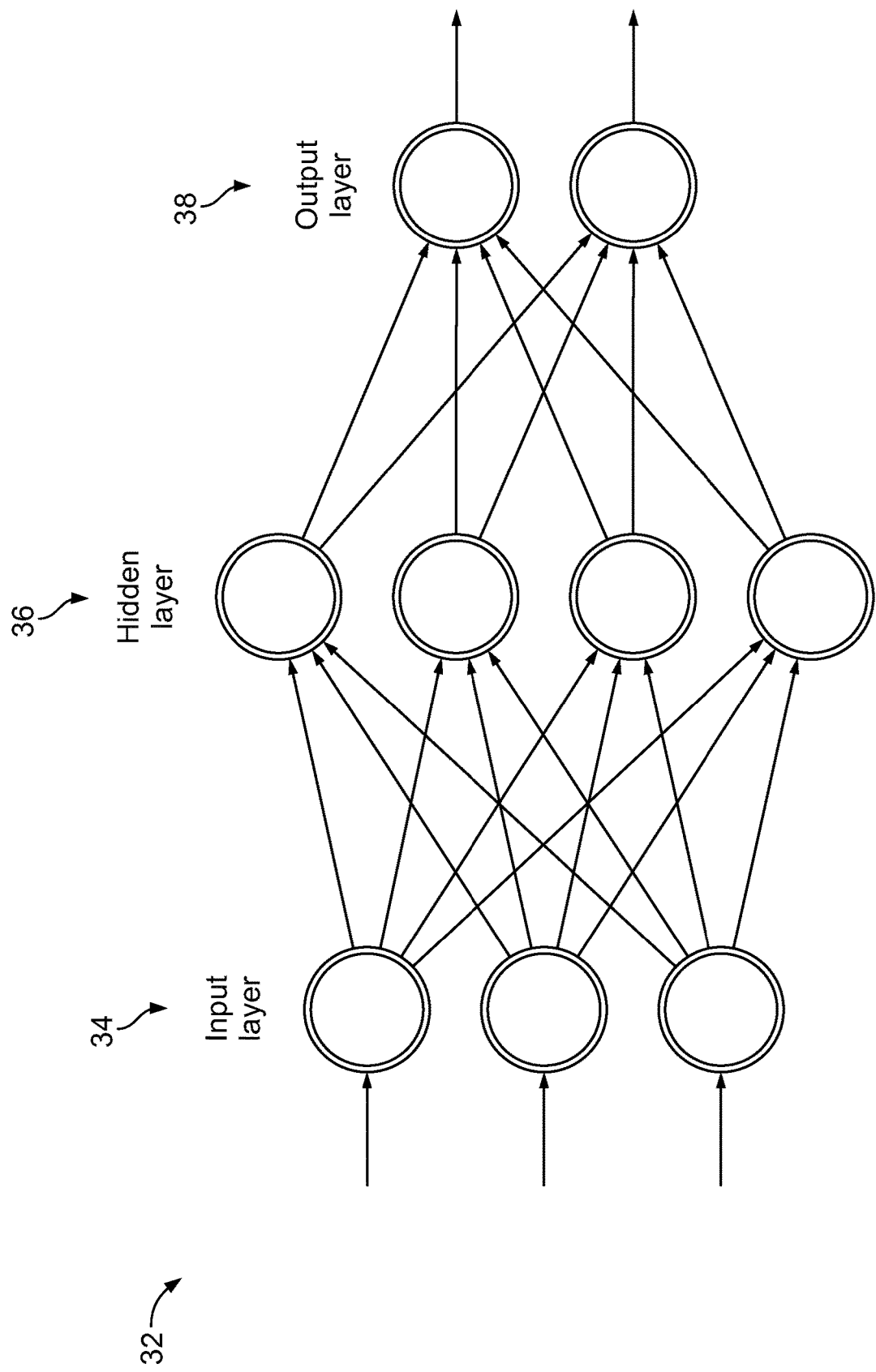
FIG. 3 schematically depicts a machine learning model according to one embodiment.

Referring to FIG. 3, a machine learning model 32 according to one embodiment may be provided in the form of a neural network. A neural network may be a series of algorithms that endeavors to recognize underlying relationships in a set of data. A "neuron" in a neural network is a mathematical function that collects and classifies information according to a specific architecture. The machine learning model includes an input layer 34, a hidden layer 36, and an output layer 38. The input layer accepts data representative of pressures and flows of brake fluid (e.g., air) in the brake pipe. The data is obtained during operation of the vehicle system. The data may be provided by one or more remote sensors, for example pressure sensors and flow meters.

According to one embodiment, the machine learning model may be an unsupervised machine learning model. The machine learning model may be a semi-supervised machine learning model. In one embodiment, the machine learning model is a supervised machine learning model. The machine learning model may be provided with training data that is labelled. Pressure and flow data that establish pressure differential signatures and flow signatures of non-anomalous operation of the brake system may be provided to the machine learning model and labelled as non-anomalous. The non-anomalous pressure differential signatures and flow signatures indicate that the brake pipe does not include any kinks, blockage(s), and/or leak(s). The training data is used by the machine learning model to establish pressure differential signatures and flow signatures that may be used to determine if pressures and flows input into the input layer of the model correspond to non-anomalous operation of the brake system.

The machine learning model may also be provided with training data that is labelled and corresponds to anomalous operation of the brake system. Pressure differential signatures and brake fluid flows that indicate that an anomaly such as a kink, blockage, or leak exists in the brake line may be included in the training data and the machine learning model may be configured to determine during operation of the brake system of the vehicle system when pressure and flow data input into the model indicate that the brake pipe includes an anomaly. The data provided to the one or more processors from the brake pipe pressure sensors and brake pipe flow sensors may be stored in the memories of the one or more processors and added to the machine learning model.

The hidden layer is located between the input layer and the output layer of the algorithm of the machine learning model. The algorithm applies weights to the inputs (e.g., pressures and flows) and directs them through an activation function as the output. The hidden layer performs nonlinear transformations of the inputs entered into the network.

Figure 4:
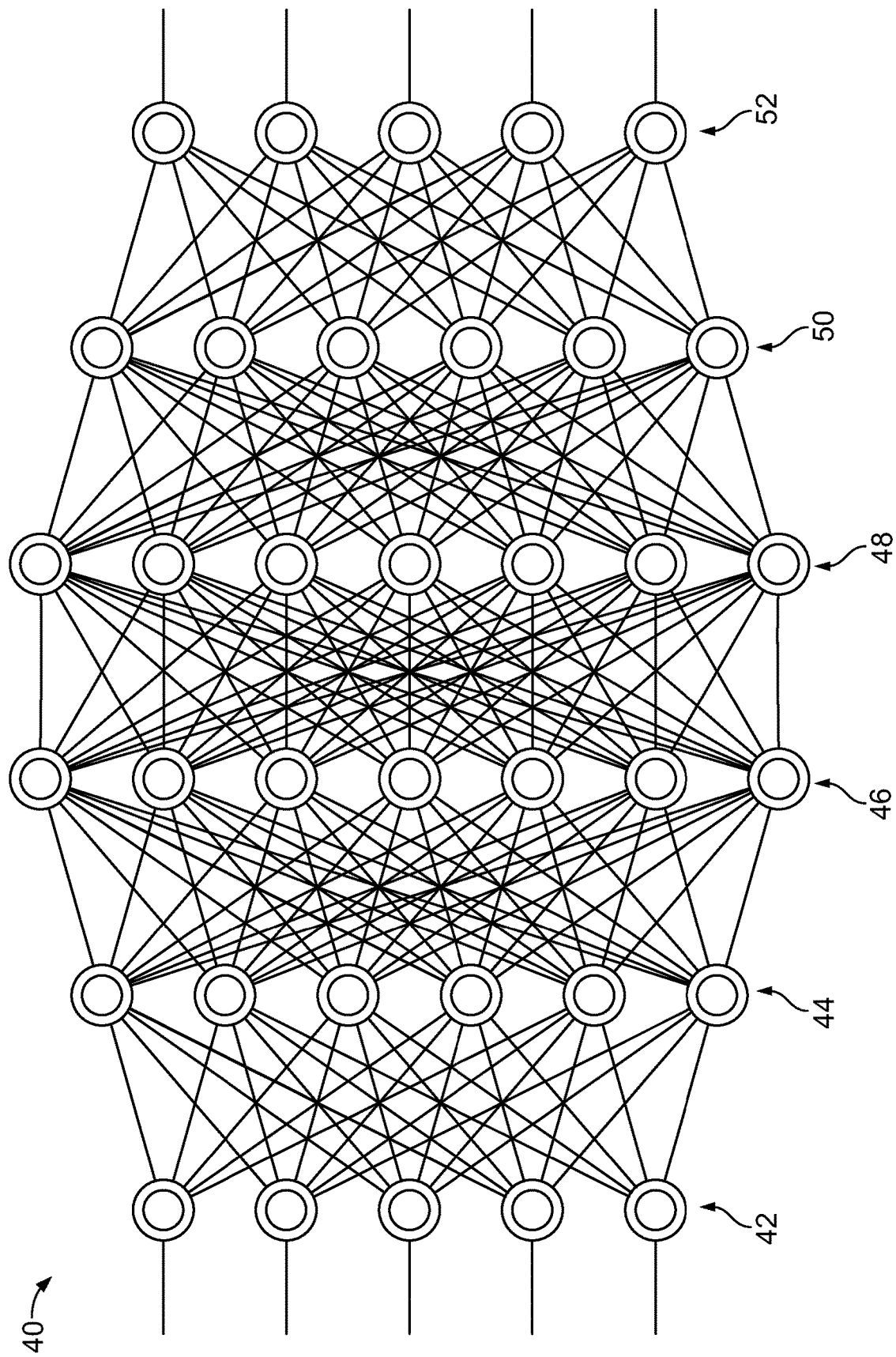
FIG. 4 schematically depicts a machine learning model according to one embodiment.

Referring to FIG. 4, a machine learning model 40 according to one embodiment includes an input layer 42, a plurality of hidden layers 44, 46, 48, 50, and an output layer 52. The machine learning model may be referred to as a deep learning machine learning model due to the plurality of hidden layers. The hidden layers may vary depending on the function of the machine learning model, and the hidden layers may vary depending on their associated weights. The hidden layers allow for the function of the machine learning model to be broken down into specific transformations of the input data. Each hidden layer function may be provided to produce a defined output. For example, one hidden layer may be used to identify whether a particular anomaly, for example a kink, is present in a particular section of the brake pipe. Another hidden layer may determine if another anomaly, for example a leak, is present in the particular section of the brake pipe. Other hidden layers may determine if other anomalies are present in other sections of the brake pipe.

The one or more processors of the HEU or the EVU may also be configured to execute instructions in the memory of the one or more processors to use the machine learning model to determine whether the information provided from the remote sensors that represent brake pipe pressures and flows indicate that an anomaly, such as a kink, a blockage, or a leak, exists in the brake pipe.

Figure 5:
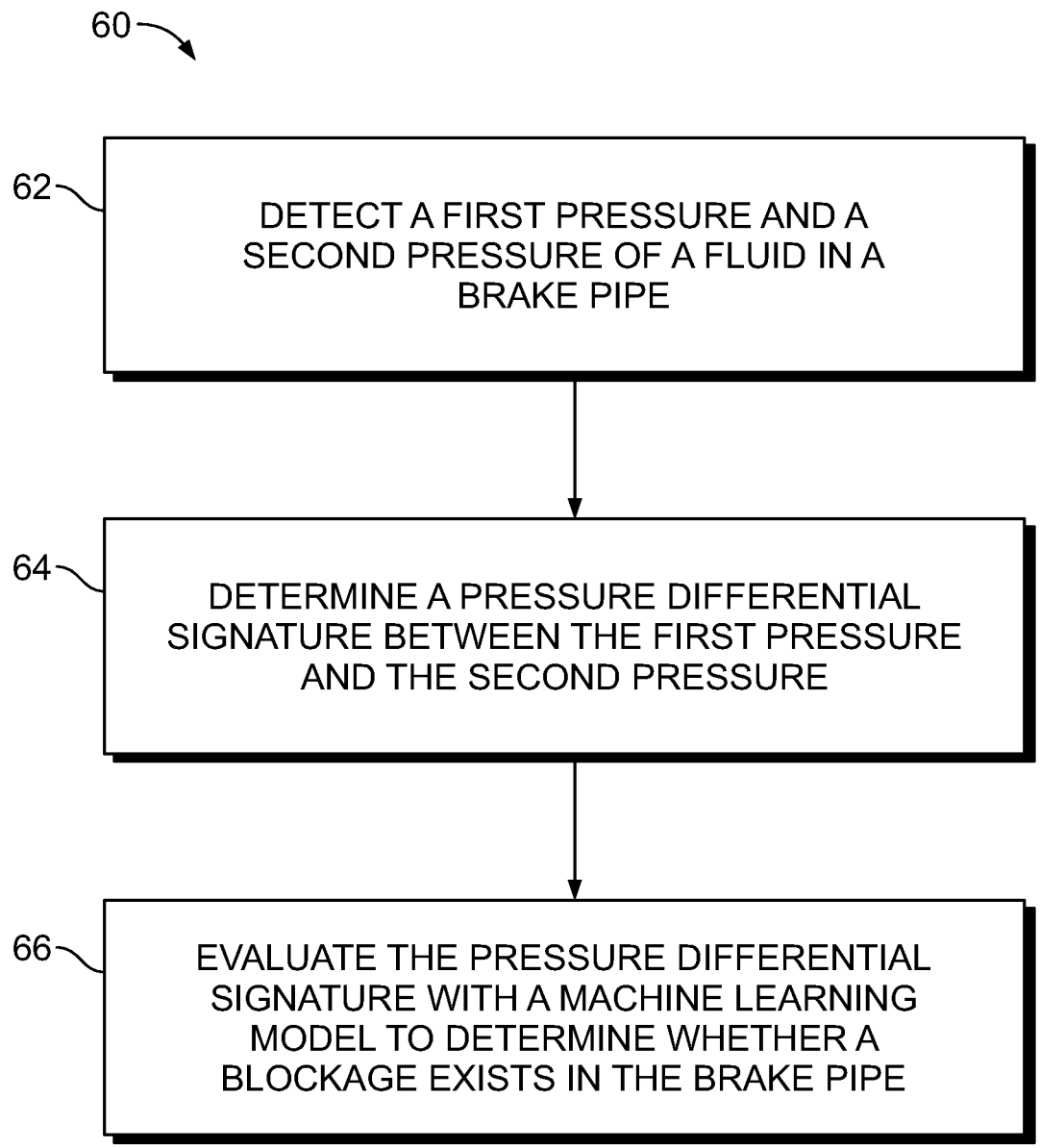
FIG. 5 schematically detects a method according to one embodiment.

Referring to FIG. 5, a method 60 according to one embodiment may comprise detecting a first pressure and a second pressure of a fluid in a brake pipe of a vehicle system that includes a plurality of vehicles 62. The brake pipe extends from a lead vehicle to an end vehicle of the plurality of vehicles. The first pressure may be measured in a lead vehicle and the second pressure being measured in an end or trailing vehicle. The method may further include determining a pressure differential signature between the first pressure and the second pressure 64. The method may further include evaluating the pressure differential signature with a machine learning model to determine whether a blockage exists in the brake pipe 66.

The method may further include detecting a flow of the fluid in the brake pipe; and evaluating the flow of the fluid with the machine learning model to determine whether one or more of a leak or the blockage exists in the brake pipe. A notice may be provided to an operator of the vehicle system responsive to a blockage or a leak being detected. If a leak is detected, a pressure of the fluid in the brake pipe may be increased at a location past the detected leak in a direction from the lead vehicle to the end vehicle. The one or more processors may control supply of brake fluid to the brake pipe from the brake fluid reservoir.

One or more third pressures in the brake pipe may be detected at one or more locations between the first pressure and the second pressure and a plurality of pressure differential signatures may be determined between one or more of (a) the first pressure and one or more of the third pressures, (b) the second pressure and one or more of the third pressures, or (c) a plurality of the third pressures. The plurality of the pressure differential signatures may be evaluated with the machine learning model to determine whether a blockage exists in the brake pipe. Alternatively, or in addition to, one or more flows of the fluid in the brake pipe between (d) one or more of the first pressure and one or more of the third pressures, (e) the second pressure and the one or more of the third pressures, or (c) the two or more of the third pressures may be detected. The one or more of the flows of the fluid may be evaluated with the machine learning model to determine whether one or more of a blockage or a leak exists in the brake pipe.

A fourth pressure of the fluid in the brake pipe may be reduced at a first location from the first pressure to the second pressure and a decreasing pressure differential signature from the first location to a second location may be determined. The decreasing pressure differential signature from the first location to the second location may be evaluated with the machine learning model to determine whether the blockage exists in the brake pipe between the first location and the second location. The fourth pressure of the fluid in the brake pipe may be raised from the second pressure to the first pressure from the first location to the second location and an increasing pressure differential signature from the first location to the second location may be determined. The increasing pressure differential signature may be evaluated with the machine learning model to determine whether one or more of the leak or the blockage exists between the first location and the second location. The first location may be in the lead vehicle and the second location may be in the end vehicle.

A third pressure of the fluid in the brake pipe may be increased or decreased at a location past a detected blockage in a direction from the lead vehicle to the end vehicle. A pressure of the fluid in the brake pipe may be pulsed at a location before a detected blockage in a direction from the lead vehicle to the end vehicle.

A notice may be provided to an operator of the vehicle system responsive to the blockage being detected. A penalty brake may be applied to one or more of the vehicles of the vehicle system in an absence of a response from the operator.

Figure 6:
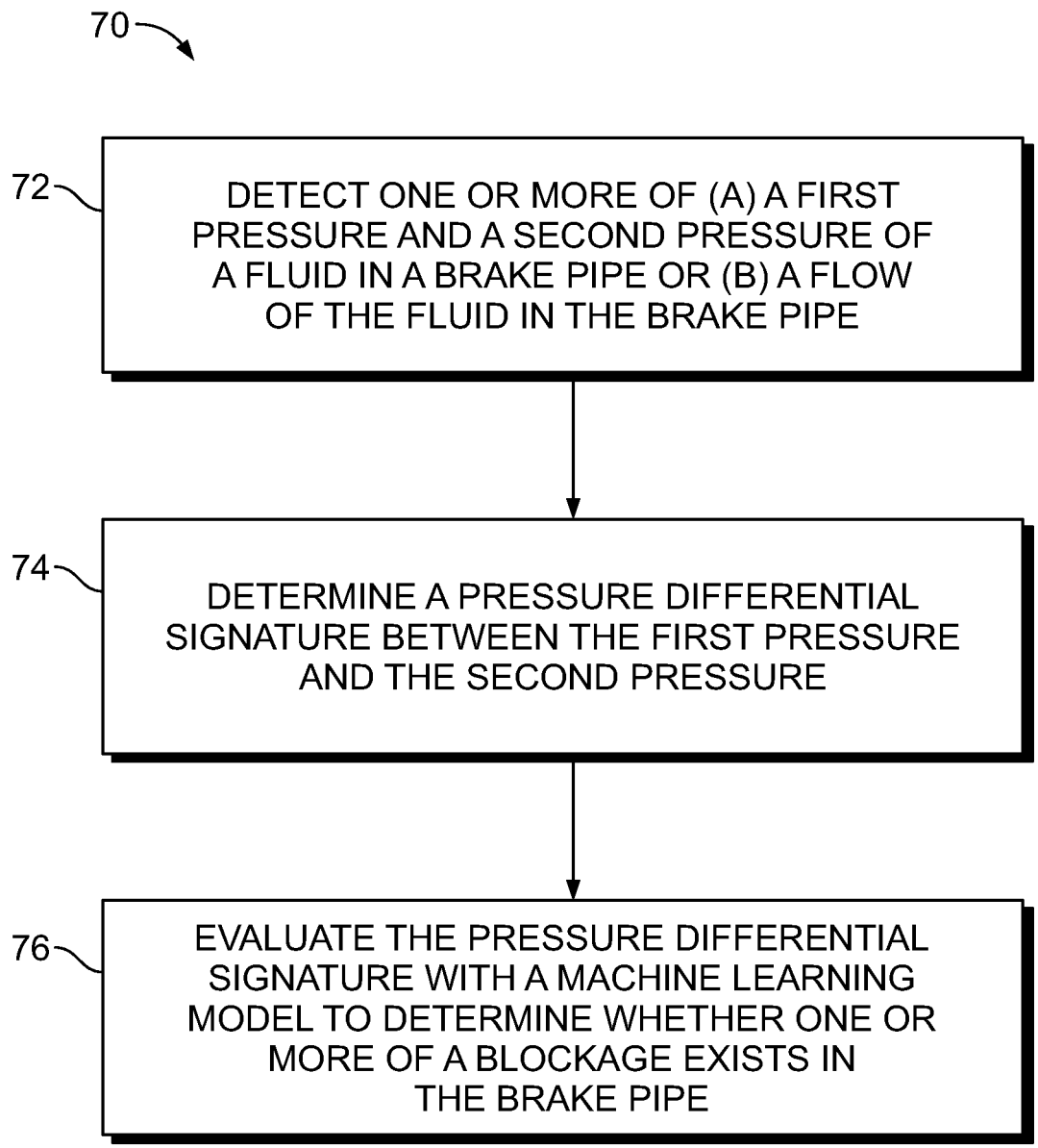
FIG. 6 schematically depicts a method according to one embodiment.

Referring to FIG. 6, a method 70 according to one embodiment may comprise detecting one or more of (a) a first pressure and a second pressure of a fluid in a brake pipe or (b) a flow of the fluid in the brake pipe of a vehicle system that includes a plurality of vehicles 72. The brake pipe extends from a lead vehicle to an end vehicle of the plurality of vehicles. The first pressure may be measured in a lead vehicle and the second pressure being measured in an end or trailing vehicle. The method may further include determining a pressure differential signature between the first pressure and the second pressure 74. The method may further include evaluating the pressure differential signature with a machine learning model to determine whether one or more of a blockage or a leak exists in the brake pipe 76

According to one embodiment, a method may include detecting a first pressure and a second pressure of a fluid in a brake pipe of a vehicle system that includes a plurality of vehicles, the brake pipe extending from a lead vehicle to an end vehicle of the plurality of vehicles, the first pressure being measured in the lead vehicle and the second pressure being measured in the end vehicle and determining a pressure differential signature between the first pressure and the second pressure. The method may further include evaluating the pressure differential signature with a machine learning model to determine whether a blockage exists in the brake pipe.

Optionally, the method may further include detecting a flow of the fluid in the brake pipe and evaluating the flow of the fluid with the machine learning model to determine whether one or more of a leak or the blockage exists in the brake pipe.

Optionally, the method may further include providing a notice to an operator of the vehicle system responsive to a leak being detected. Optionally, the method may further include increasing a pressure of the fluid in the brake pipe at a location past a detected leak in a direction from the lead vehicle to the end vehicle.

Optionally, the method may further include detecting one or more third pressures in the brake pipe at one or more locations between the first pressure and the second pressure and determining a plurality of the pressure differential signatures between one or more of (a) the first pressure and one or more of the third pressures, (b) the second pressure and one or more of the third pressures, or (c) a plurality of the third pressures and evaluating the plurality of the pressure differential signatures with the machine learning model to determine whether the blockage exists in the brake pipe. Optionally, the method may further include detecting one or more flows of the fluid in the brake pipe between (d) one or more of the first pressure and one or more of the third pressures, (e) the second pressure and the one or more of the third pressures, or (c) the two or more of the third pressures and evaluating one or more of the flows of the fluid with the machine learning model to determine whether one or more of the blockage or the leak exists in the brake pipe.

Optionally, the method may further include reducing a fourth pressure of the fluid in the brake pipe at a first location from the first pressure to the second pressure, determining a decreasing pressure differential signature from the first location to a second location, and evaluating the decreasing pressure differential signature from the first location to the second location with the machine learning model to determine whether the blockage exists in the brake pipe between the first location and the second location.

Optionally, the method may further include raising the fourth pressure of the fluid in the brake pipe from the second pressure to the first pressure from the first location to the second location; determining an increasing pressure differential signature from the first location to the second location, and evaluating the increasing pressure differential signature with the machine learning model to determine whether one or more of the leak or the blockage exists between the first location and the second location. Optionally, the first location may be in the lead vehicle and the second location may be in the end vehicle.

Optionally, the method may further include increasing or decreasing a third pressure of the fluid in the brake pipe at a location past a detected blockage in a direction from the lead vehicle to the end vehicle.

Optionally, the method may further include pulsing a pressure of the fluid in the brake pipe at a location before a detected blockage in a direction from the lead vehicle to the end vehicle.

Optionally, the method may further include providing a notice to an operator of the vehicle system responsive to the blockage being detected. Optionally, the method may further include applying a penalty brake to one or more of the vehicles of the vehicle system in an absence of a response from the operator.

Optionally, the method may further include adding the first pressure, the second pressure, and the pressure differential signature to the machine learning model. Optionally, the method may further include adding the flow to the machine learning model.

According to one embodiment, a system may include one or more processors configured to detect a first pressure and a second pressure of a fluid in a brake pipe of a vehicle system that includes a plurality of vehicles, the brake pipe extending from a lead vehicle to an end vehicle of the plurality of vehicles, the first pressure being measured in the lead vehicle and the second pressure being measured in the end vehicle, determine a pressure differential signature between the first pressure and the second pressure, and evaluate the pressure differential signature with a machine learning model to determine whether a blockage exists in the brake pipe.

Optionally, the one or more processors may be further configured to detect a flow of the fluid in the brake pipe and evaluate the flow of the fluid with the machine learning model to determine whether one or more of a leak or the blockage exists in the brake pipe.

Optionally, the one or more processors may be further configured to provide a notice to an operator of the vehicle system responsive to a leak being detected.

Optionally, the one or more processors may be further configured to increase a pressure of the fluid in the brake pipe at a location past the detected leak in a direction from the lead vehicle to the end vehicle.

Optionally, the one or more processor may be further configured to detect one or more third pressures in the brake pipe at one or more locations between the first pressure and the second pressure and determine a plurality of the pressure differential signatures between one or more of (a) the first pressure and one or more of the third pressures, (b) the second pressure and one or more of the third pressures, or (c) a plurality of the third pressures and evaluate the plurality of the pressure differential signatures with the machine learning model to determine whether the blockage exists in the brake pipe.

Optionally, the one or more processors may be further configured to detect one or more flows of the fluid in the brake pipe between (d) one or more of the first pressure and one or more of the third pressures, (e) the second pressure and the one or more of the third pressures, or (c) the two or more of the third pressures and evaluate one or more of the flows of the fluid with the machine learning model to determine whether one or more of the blockage or the leak exists in the brake pipe.

Optionally, the one or more processors may be further configured to reduce a fourth pressure of the fluid in the brake pipe at a first location from the first pressure to the second pressure, determine a decreasing pressure differential signature from the first location to a second location, and evaluate the decreasing pressure differential signature from the first location to the second location with the machine learning model to determine whether the blockage exists in the brake pipe between the first location and the second location.

Optionally, the one or more processors may be further configured to raise the fourth pressure of the fluid in the brake pipe from the second pressure to the first pressure from the first location to the second location, determine an increasing pressure differential signature from the first location to the second location, and evaluate the increasing pressure differential signature with the machine learning model to determine whether one or more of the leak or the blockage exists between the first location and the second location. Optionally, the first location may be in the lead vehicle and the second location may be in the end vehicle.

Optionally, the one or more processors may be further configured to increase or decrease a third pressure of the fluid in the brake pipe at a location past a detected blockage in a direction from the lead vehicle to the end vehicle.

Optionally, the one or more processors may be further configured to pulse a pressure of the fluid in the brake pipe at a location before a detected blockage in a direction from the lead vehicle to the end vehicle.

Optionally, the one or more processors may be further configured to provide a notice to an operator of the vehicle system responsive to the blockage being detected. Optionally, the one or more processors may be further configured to apply a penalty brake to one or more of the vehicles of the vehicle system in an absence of a response from the operator.

Optionally, the one or more processors may be further configured to add the first pressure, the second pressure, and the pressure differential signature to the machine learning model. Optionally, the one or more processors may be further configured to add the flow to the machine learning model.

According to one embodiment, a vehicle system may include a plurality of vehicles, the plurality of vehicles including a lead vehicle and an end vehicle. The vehicle system may further include a brake system comprising a brake pipe extending along the plurality of vehicles from the lead vehicle to the end vehicle and one or more processors. The one or more processors may be configured to detect one or more of (a) detect a first pressure and a second pressure of a fluid in the brake pipe, the first pressure being measured in the lead vehicle and the second pressure being measured in the end vehicle, or (b) a flow of the fluid in the brake pipe, determine a pressure differential signature between the first pressure and the second pressure, and evaluate one or more of the pressure differential signature or the flow with a machine learning model to determine whether one or more of a blockage or a leak exists in the brake pipe.

Optionally, the one or more processors may be further configured to provide a notice to an operator of the vehicle system responsive to a leak being detected.

Optionally, the one or more processors may be further configured to increase a pressure of the fluid in the brake pipe at a location past the detected leak in a direction from the lead vehicle to the end vehicle.

Optionally, the one or more processor may be further configured to detect one or more third pressures in the brake pipe at one or more locations between the first pressure and the second pressure, determine a plurality of the pressure differential signatures between one or more of (a) the first pressure and one or more of the third pressures, (b) the second pressure and one or more of the third pressures, or (c) a plurality of the third pressures, and evaluate the plurality of the pressure differential signatures with the machine learning model to determine whether the blockage exists in the brake pipe.

Optionally, the one or more processors may be further configured to detect one or more flows of the fluid in the brake pipe between (d) one or more of the first pressure and one or more of the third pressures, (e) the second pressure and the one or more of the third pressures, or (c) the two or more of the third pressures, and evaluate one or more of the flows of the fluid with the machine learning model to determine whether one or more of the blockage or the leak exists in the brake pipe.

Optionally, the one or more processors may be further configured to reduce a fourth pressure of the fluid in the brake pipe at a first location from the first pressure to the second pressure, determine a decreasing pressure differential signature from the first location to a second location, and evaluate the decreasing pressure differential signature from the first location to the second location with the machine learning model to determine whether the blockage exists in the brake pipe between the first location and the second location.

Optionally, the one or more processors may be further configured to raise the fourth pressure of the fluid in the brake pipe from the second pressure to the first pressure from the first location to the second location, determine an increasing pressure differential signature from the first location to the second location, and evaluate the increasing pressure differential signature with the machine learning model to determine whether one or more of the leak or the blockage exists between the first location and the second location. Optionally, the first location may be in the lead vehicle and the second location may be in the end vehicle.

Optionally, the one or more processors may be further configured to increase or decrease a third pressure of the fluid in the brake pipe at a location past a detected blockage in a direction from the lead vehicle to the end vehicle.

Optionally, the one or more processors may be further configured to pulse a pressure of the fluid in the brake pipe at a location before a detected blockage in a direction from the lead vehicle to the end vehicle.

Optionally, the one or more processors may be further configured to provide a notice to an operator of the vehicle system responsive to the blockage being detected. Optionally, the one or more processors may be further configured to apply a penalty brake to one or more of the vehicles of the vehicle system in an absence of a response from the operator.

Optionally, the one or more processors may be further configured to add one or more of the first pressure, the second pressure, the pressure differential signature or the flow to the machine learning model.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   detecting a first pressure and a second pressure of a fluid in a brake pipe of a vehicle system that includes a plurality of vehicles, the brake pipe extending from a lead vehicle of the plurality of vehicles to an end vehicle of the plurality of vehicles, the brake pipe including a plurality of sections, and the first pressure being measured in the lead vehicle and the second pressure being measured in the end vehicle;
   determining a pressure differential signature between the first pressure and the second pressure;
   evaluating the pressure differential signature with a machine learning model including a plurality of hidden layers, each hidden layer of the plurality of hidden layers corresponding to a different section of the plurality of sections, to determine whether a blockage or a leak exists in the brake pipe and which section or sections of the plurality of sections the blockage or the leak exists; and
   responsive to determining a blockage or a leak exists, adjusting a pressure of the fluid in the brake pipe at a location past the section or sections for which the blockage or the leak is determined.

2. The method of claim 1, further comprising:
   detecting a flow rate of the fluid in the brake pipe; and
   evaluating the flow rate of the fluid with the machine learning model to determine whether one or more of the blockage or the leak exists in the brake pipe.

3. The method of claim 2, further comprising:
   increasing a pressure of the fluid in the brake pipe at a location past a detected blockage or a detected leak in a direction from the lead vehicle to the end vehicle.

4. The method of claim 2, further comprising:
   detecting one or more third pressures in the brake pipe at one or more locations between the first pressure and the second pressure; and
   determining a plurality of pressure differential signatures between one or more of (a) the first pressure and one or more of the third pressures, (b) the second pressure and one or more of the third pressures, or (c) a plurality of the third pressures; and
   evaluating the plurality of the pressure differential signatures with the machine learning model to determine whether the blockage or the leak exists in the brake pipe.

5. The method of claim 4, further comprising:
   detecting one or more flow rates of the fluid in the brake pipe between (d) one or more of the first pressure and one or more of the third pressures, (e) the second pressure and the one or more of the third pressures, or (f) the two or more of the third pressures; and
   evaluating one or more of the flow rates of the fluid with the machine learning model to determine whether one or more of the blockage or the leak exists in the brake pipe.

6. The method of claim 5, further comprising:
   reducing a fourth pressure of the fluid in the brake pipe at a first location from the first pressure to the second pressure:
   determining a decreasing pressure differential signature from the first location to a second location; and
   evaluating the decreasing pressure differential signature from the first location to the second location with the machine learning model to determine whether the blockage or the leak exists in the brake pipe between the first location and the second location.

7. The method of claim 6, further comprising:
   raising the fourth pressure of the fluid in the brake pipe from the second pressure to the first pressure from the first location to the second location;
   determining an increasing pressure differential signature from the first location to the second location; and
   evaluating the increasing pressure differential signature with the machine learning model to determine whether one or more of the leak or the blockage exists between the first location and the second location.

8. The method of claim 7, wherein the first location is in the lead vehicle and the second location is in the end vehicle.

9. The method of claim 1, further comprising:
   increasing or decreasing a third pressure of the fluid in the brake pipe at a location past a detected blockage or a detected leak in a direction from the lead vehicle to the end vehicle.

10. The method of claim 1, further comprising:
    pulsing a pressure of the fluid in the brake pipe at allocation before a detected blockage or a detected leak in a direction from the lead vehicle to the end vehicle.

11. The method of claim 1, further comprising:
    providing a notice to an operator of the vehicle system responsive to the blockage or the leak being detected.

12. The method of claim 11, further comprising:
    applying a penalty brake to one or more of the vehicles of the vehicle system in an absence of a response from the operator from the notice that is provided.

13. The method of claim 1, further comprising:
    adding the first pressure, the second pressure, and the pressure differential signature to the machine learning model.

14. The method of claim 2, further comprising:
    adding the flow rate to the machine learning model.

15. A system, comprising:
    one or more processors configured to:
    detect a first pressure and a second pressure of a fluid in a brake pipe of a vehicle system that includes a plurality of vehicles, the brake pipe extending from a lead vehicle of the plurality of vehicles to an end vehicle of the plurality of vehicles, the brake pipe including a plurality of sections, and the first pressure being measured in the lead vehicle and the second pressure being measured in the end vehicle;

determine a pressure differential signature between the first pressure and the second pressure;

evaluate the pressure differential signature with a machine learning model including a plurality of hidden layers, each hidden layer of the plurality of hidden layers corresponding to a different section of the plurality of sections, to determine whether a blockage or a leak exists in the brake pipe and which section or sections of the plurality of sections the blockage or the leak exists; and responsive to determining a blockage or a leak exists, adjusting a pressure of the fluid in the brake pipe at a location past the section or sections for which the blockage or the leak is determined.

16. The system of claim 15, wherein the one or more processors are further configured to:

detect a flow rate of the fluid in the brake pipe; and evaluate the flow rate of the fluid with the machine learning model to determine whether one or more of the blockage or the leak exists in the brake pipe.

17. The system of claim 16, wherein the one or more processors are further configured to:

increase a pressure of the fluid in the brake pipe at a location past a detected blockage or a detected leak in a direction from the lead vehicle to the end vehicle.

18. The system of claim 16, wherein the one or more processors are further configured to:

detect one or more third pressures in the brake pipe at one or more locations between the first pressure and the second pressure; and determine a plurality of pressure differential signatures between one or more of (a) the first pressure and one or more of the third pressures, (b) the second pressure and one or more of the third pressures, or (c) a plurality of the third pressures; and evaluate the plurality of the pressure differential signatures with the machine learning model to determine whether the blockage or the leak exists in the brake pipe.

19. The system of claim 18, wherein the one or more processors are further configured to:

detect one or more flow rates of the fluid in the brake pipe between (d) one or more of the first pressure and one or more of the third pressures, (e) the second pressure and the one or more of the third pressures, or (f) the two or more of the third pressures; and evaluate one or more of the flow rates of the fluid with the machine learning model to determine whether one or more of the blockage or the leak exists in the brake pipe.

20. The system of claim 19, wherein the one or more processors are further configured to:

reduce a fourth pressure of the fluid in the brake pipe at a first location from the first pressure to the second pressure;

determine a decreasing pressure differential signature from the first location to a second location; and evaluate the decreasing pressure differential signature from the first location to the second location with the machine learning model to determine whether the blockage or the leak exists in the brake pipe between the first location and the second location.

21. The system of claim 20, wherein the one or more processors are further configured to:

raise the fourth pressure of the fluid in the brake pipe from the second pressure to the first pressure from the first location to the second location;

determine an increasing pressure differential signature from the first location to the second location; and evaluate the increasing pressure differential signature with the machine learning model to determine whether one or more of the leak or the blockage exists between the first location and the second location.

22. The system of claim 21, wherein the first location is in the lead vehicle and the second location is in the end vehicle.

23. The system of claim 15, wherein the one or more processors are further configured to:

increase or decrease a third pressure of the fluid in the brake pipe at a location past a detected blockage or a detected leak in a direction from the lead vehicle to the end vehicle.

24. The system of claim 15, wherein the one or more processors are further configured to:

pulse a pressure of the fluid in the brake pipe at a location before a detected blockage or a detected leak in a direction from the lead vehicle to the end vehicle.

25. The system of claim 15, wherein the one or more processors are further configured to:

provide a notice to an operator of the vehicle system responsive to the blockage or the leak being detected.

26. The system of claim 25, wherein the one or more processors are further configured to:

apply a penalty brake to one or more of the vehicles of the vehicle system in an absence of a response from the operator to the notice that is provided.

27. The system of claim 15, wherein the one or more processors are further configured to:

add the first pressure, the second pressure, and the pressure differential signature to the machine learning model.

28. The system of claim 16, wherein the one or more processors are further configured to:

add the flow rate to the machine learning model.

29. A brake system, comprising:

a brake pipe extending along a plurality of vehicles in a vehicle system that includes a lead vehicle and an end vehicle, the brake pipe extending from the lead vehicle to the end vehicle, and the brake pipe including a plurality of sections; and one or more processors configured to:

detect a flow rate of fluid in the brake pipe;

evaluate the flow rate with a machine learning model including a plurality of hidden layers, each hidden layer of the plurality of hidden layers corresponding to a different section of the plurality of sections, to determine whether one or more of a blockage or a leak exists in the brake pipe and which section or sections of the plurality of sections the one or more of the blockage or the leak exists; and responsive to determining a blockage or a leak exists, adjusting a pressure of the fluid in the brake pipe at a location past the section or sections for which the blockage or the leak is determined.

30. The brake system of claim 29, wherein the one or more processors are further configured to:

increase a pressure of the fluid in the brake pipe at a location past the blockage or the leak that is detected in a direction from the lead vehicle to the end vehicle.

31. The brake system of claim 29, wherein the one or more processors are further configured to:

detect a first pressure and a second pressure;

detect one or more third pressures in the brake pipe at one or more locations between the first pressure and the second pressure;

determine a plurality of pressure differential signatures between one or more of (a) the first pressure and one or more of the third pressures, (b) the second pressure and one or more of the third pressures, or (c) a plurality of third pressures; and evaluate the plurality of the pressure differential signatures with the machine learning model to determine whether the blockage or the leak exists in the brake pipe.

32. The brake system of claim 31, wherein the one or more processors are further configured to:

detect the flow rate of the fluid in the brake pipe between (d) one or more of the first pressure and one or more of the third pressures, (e) the second pressure and the one or more of the third pressures, or (f) the two or more of the third pressures; and evaluate the flow rate of the fluid with the machine learning model to determine whether one or more of the blockage or the leak exists in the brake pipe.

33. The brake system of claim 32, wherein the one or more processors are further configured to:

reduce a fourth pressure of the fluid in the brake pipe at a first location from the first pressure to the second pressure;

determine a decreasing pressure differential signature from the first location to a second location; and evaluate the decreasing pressure differential signature from the first location to the second location with the machine learning model to determine whether the blockage or the leak exists in the brake pipe between the first location and the second location.

34. The brake system of claim 33, wherein the one or more processors are further configured to:

raise the fourth pressure of the fluid in the brake pipe from the second pressure to the first pressure form the first location to the second location;

determine an increasing pressure differential signature from the first location to the second location; and evaluate the increasing pressure differential signature with the machine learning model to determine whether one or more of the leak or the blockage exists between the first location and the second location.

35. The brake system of claim 34, wherein the first location is in the lead vehicle and the second location is in the end vehicle.

36. The brake system of claim 29, wherein the one or more processors are further configured to:

increase or decrease a third pressure of the fluid in the brake pipe at a location past the blockage or the leak that is detected in a direction from the lead vehicle to the end vehicle.

37. The brake system of claim 29, wherein the one or more processors are further configured to:

pulse a pressure of the fluid in the brake pipe at allocation before the blockage or the leak that is detected in a direction from the lead vehicle to the end vehicle.

38. The brake system of claim 29, wherein the one or more processors are further configured to:

provide a notice to an operator of the vehicle system responsive to the blockage or the leak being detected.

39. The brake system of claim 38, wherein the one or more processors are further configured to:

apply a penalty brake to one or more of the vehicles of the vehicle system in an absence of a response from the operator to the notice that is provided.

40. The brake system of claim 31, wherein the one or more processors are further configured to:

add one or more of the first pressure, the second pressure, the plurality of pressure differential signatures, or the flow rate to the machine learning model.

41. The method of claim 1, wherein the blockage is at least one of a partial blockage or a total blockage, and wherein the blockage is defined by a kink.

42. The system of claim 15, wherein the blockage is at least one of a partial blockage or a total blockage, and wherein the blockage is defined by a kink.

43. The brake system of claim 29, wherein the blockage is at least one of a partial blockage or a total blockage, and wherein the blockage is defined by a kink.

* * * * *